Feb. 22, 1966  H. E. THOMASON  3,236,294
BASEMENTLESS SOLAR HOME
Filed Nov. 9, 1961  2 Sheets-Sheet 2
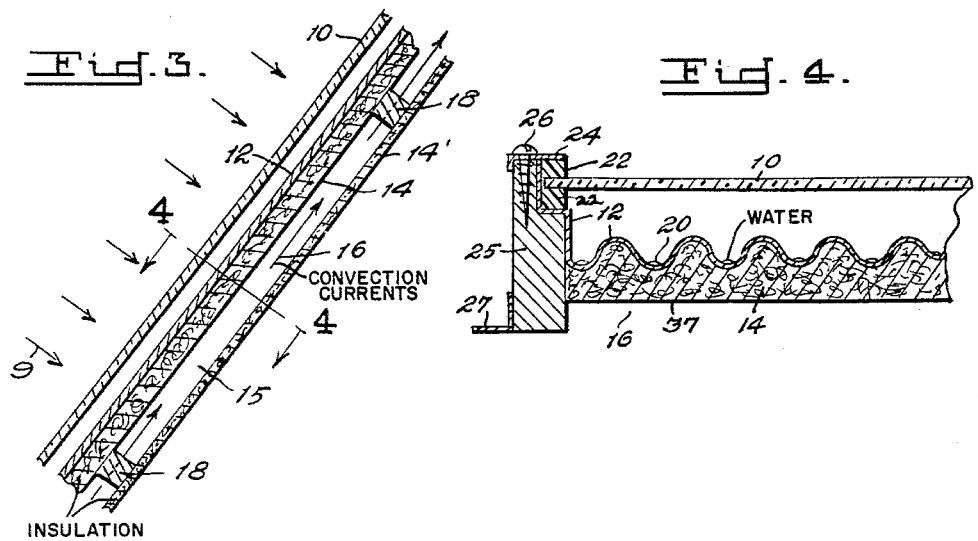
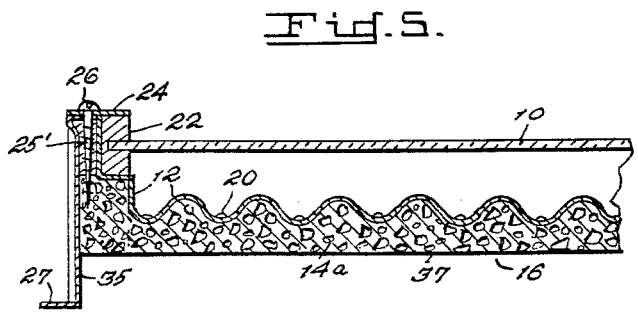
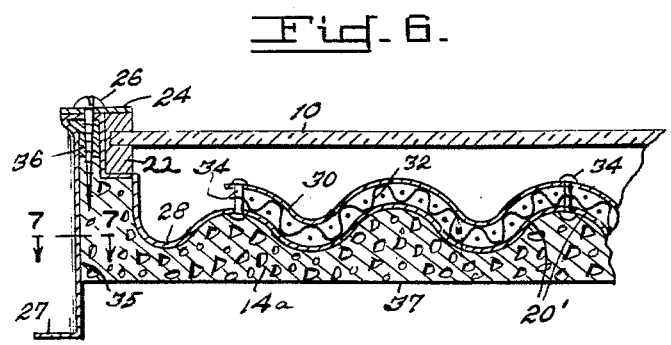
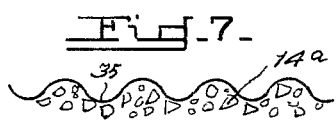
INVENTOR.
Harry E. Thomason 3,236,294
BASEMENTLESS SOLAR HOME
Harry E. Thomason, District Heights, Md.
(7354 Walker Mill Road SE., Washington, D.C. 20027)
Filed Nov. 9, 1961, Ser. No. 151,320
8 Claims. (Cl. 165—48)

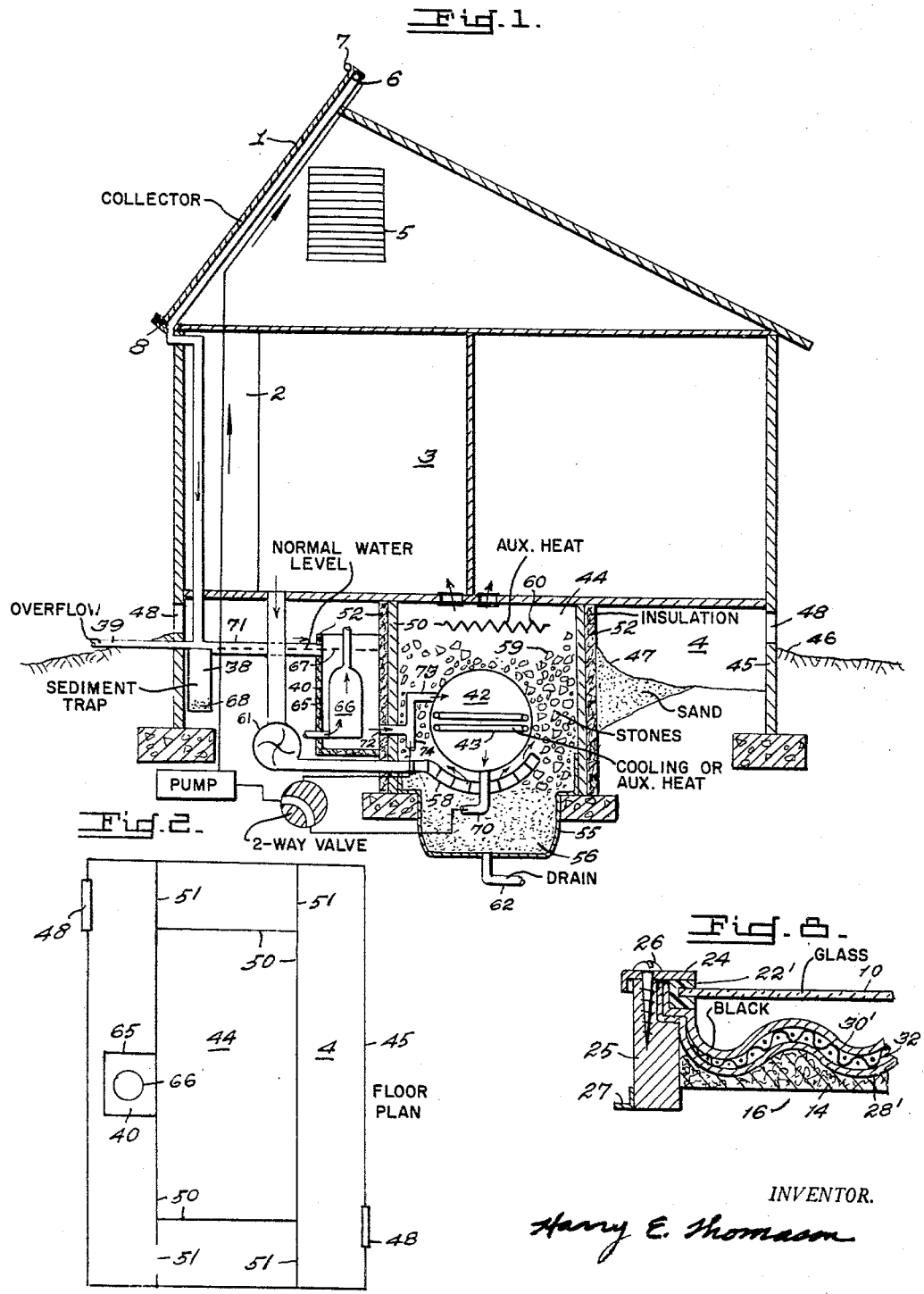

In order to make a solar space heating system worthwhile and acceptable by the public it is necessary that the system be made simple, efficient, long lived and inexpensive to construct, maintain and operate. In many instances it is desirable to have the apparatus reversible for summertime air conditioning and usable to heat domestic water, swimming pool water etc. for the home, motel or other building. Also, the system should have heat storage means for storing heat, for storing "coolness" or for stabilizing home temperatures during variable spring and autumn weather as the ambient air temperatures fluctuate widely. Many homes are being constructed without basements and with only crawl spaces between the floor and the earth. If such type home is to be heated by solar energy, cooled by stored coolness, and the home temperatures are to be stabilized, then simple, low cost, highly effective heat or cold storage apparatus must be devised. The heat collection apparatus must also be simple, inexpensive, highly efficient and long lived.

The present apparatus is intended to meet many of the problems of year-round home comforting at low cost.

In the drawings:

FIG. 1 is a cross section of a solar heated and air conditioned home.

FIG. 2 is a plan view of the heat storage apparatus in relation to the foundation walls of the home.

FIG. 3 is a cross-section of the solar heat collector.

FIG. 4 is a section along line 4—4 of FIG. 3.

FIG. 5 is a modification of the heat collector.

FIG. 6 is another modification of the heat collector.

FIG. 7 is a sectional view along line 7—7 of FIG. 6.

FIG. 8 is a modification of the heat collector.

A solar heated and air conditioned home is illustrated diagrammatically in FIG. 1. Such home has a solar heat collector 1 preferably turned in a southwesterly direction to take advantage of more favorable afternoon solar heat collecting conditions. The home illustrated has closet space at 2 with living quarters at 3 and crawl space 4. Ventilators are provided at 5 to permit hot air to escape from the attic on hot summer days. The heat collector may have distributor manifolds at 6 and 7 and a collector manifold at 8 for purposes to be more fully described hereinafter.

The solar heat collector is preferably constructed as illustrated in FIGS. 3 and 4. Solar energy comes in as at 9 and passes thru transparency 10 to a darkened collector sheet 12. Insulation at 14 and further insulation at 14' provide spaces or chimneys 15 therebetween so that heat escaping through the insulation 14 of the collector on a hot summer day will heat the air in space 15 and cause such air to rise as at 16. This takes away excess heat automatically and avoids overheating of the space behind the collector, which may be closet space, an attic, or the interior of the home or other building. Spacers 18 support the heat collector spaced from insulation 14'. The spacer blocks 18 do not extend completely across the collector and therefore the ascending heated air passes therearound. A fluid to be heated is circulated thru the collector, small streams of water 20 flowing down the valleys of a corrugated collector sheet being used for illustrative purposes.

In solar heat collectors temperature extremes from below zero to several hundreds of degrees Fahrenheit may be experienced. Thus, expansion and contraction problems in component parts may be expected. Also, dust, water vapor, condensation, freezing and thawing of water particles, etc. tend to deteriorate the collector. Thus it is desirable to have a collector construction with the edges of the transparent material 10 sandwiched between sealing means, such as long-lived, resilient neoprene sponge material 22. A cap strip 24 may be simply secured to frame member 25 by screws 26. Lugs 27, or other expedients, may be used to secure the collector to a suitable support such as the roof of a building to be heated.

To protect the frame member 25 from damaging effects of water vapor, to seal out dust, and for other advantages, the collector sheet 12 is preferably crimped and made continuous adjacent frame member 25 as illustrated to receive sealing means 22. Thus, no vapor from inside the collector can get to the frame member and water, dust, etc. from the outside cannot get into the collector.

FIG. 5 illustrates a modification wherein a simple screw securing member 25' is used to replace frame member 25. A foam-like insulation material 14a may be used and is foamed into place to rigidify the collecting sheet 12, to insulate, to simplify construction and to lower construction costs. The collector sheet is preferably made continuous along the collector edge in the crimped fashion illustrated in FIG. 5 (or in FIG. 6) and the base sheet may be corrugated along leg 35, as shown in FIG. 7, for added strength and rigidity. Thus, the resultant construction has no place for water vapor to escape from the interior to damage frame members, insulation, or such, and water, snow, ice, etc. are similarly sealed out.

The solar heat collector of FIG. 6 preferably includes a corrugated sheet at 28 preferably having bright reflecting upper and lower surfaces, and a second corrugated heat collecting sheet 30 having its outer surface treated to make it absorbent of solar energy and with a low degree of radiation of heat energy, that is, having a "selective black" surface, or having a dull black surface. A liquid or gas to be heated, as at 20', is passed down (or up) between the two sheets 28, 30. In order to spread the fluid and provide better contact between the heated metal and the liquid or gas being heated, a spacer element is provided as at 32. This spacer element is preferably a mesh-like material. It has been found that corrugated aluminum for sheets 28 and 30 and aluminum screen wire at 32 are good, long-lived and low-cost. The mesh-like (screen) 32 is preferably heat conducting so as to transfer heat readily to the flowing stream of fluid whether it be a gas such as air or a liquid such as water. Means such as rivets 34 may be used to prevent separation of members 28, 30, 32. Although a gas can be used as the heat transfer fluid, such gas being preferably circulated from the bottom to the top of the collector, a liquid such as water is preferred and the liquid would preferably be circulated from the top to gravitate to the bottom. The spacer 32 tends to spread the liquid and make it contact the portions of the spacer as well as making it contact both of the corrugated sheets to pick up heat from these sheets. Thus, the liquid weaves back-and-forth, in-and-out as it progresses down the canals formed by the corrugated sheets.

Upper sheet 30 is shown as not extending completely to the edge of the collector panel. Thus, if the total amount of fluid introduced at the top will not flow between sheets 28 and 30, the excess may flow out into the unrestricted channel at the edge. However, the upper sheet may extend completely to the edge if desired, such as in FIG. 8, thus completely sealing the area in which fluid is flowing.

If desired a single corrugated sheet may be folded back upon itself as in FIG. 8 to provide both the top sheet 30' and the bottom sheet 28', the resulting folded sheet being approximately one half the width of the original stock material and thus having one edge completely and absolutely sealed without any welding or such. Spacer 32 is similar to that of FIG. 6 and the upper surface of collector sheet 30' preferably has a black or a selective black coating.

If desired, the original stock material may be tubular in form such that, when it is flattened and crimped along the edges to form the top and bottom sheets, the edges are both completely and absolutely sealed as explained above relative to one edge in FIG. 8.

Although the drawings show corrugated collecting sheets in FIGS. 3–8 the sheets could take other forms such as embossed, planar, V-crimped, etc.

A backing of reflective foil or kraft paper or hardboard or such may be provided at 37 to help retain heat, protect the insulation and to make the collector panel more attractive. Or, corrugated sheet metal similar to sheet 12 may be used for this backing material. The transparency securing screws 26 of FIGS. 5 and 6 may be anchored directly into the sheet itself with sheet metal screws or the screws may screw into captive nuts or into a small strip of wood 25' in FIG. 5 or 36 in FIG. 6, or into other suitable material. When the plastic foam insulation is foamed into place it adheres tenaciously to the corrugated sheet metal, the box sides 35, the screw attaching means 25' or 36 and the backing material 37. Thus, a long lived, firm, composite, light weight, low cost, highly efficient construction is provided.

The collector construction of FIGS. 6 and 8 minimizes water vapor and heat losses and keeps the outer solar-to-thermal collector surface 30 or 30' from being exposed to excessive damaging liquid and vapor. Space 15 provides for air circulation to take away excessive heat. Thus collector temperatures are kept from soaring excessively if the apparatus is not in use, and heat passage through the collector into the space behind the insulation 14' is minimized. As may be seen from FIG. 3 any excessive heat leakage through the collector, such as on hot summer days for example, is carried upwardly under the collector insulation 14 (or 14a) and may go into the attic and out through vents 5 by ascending air currents 16 behind the collector. When water is the fluid to be heated this heated water may be collected at the bottom of the collector at 8 (see FIG. 1) to flow into sediment trap 38 and through a domestic water preheater assembly at 40 and on via 72, 73 to liquid storage drum 42 in the heat or cold storage bin. An overflow pipe to the outside is shown at 39 and cooling or auxiliary heating coils may be provided in drum 42 at 43. The storage bin 44 is illustrated as constructed in a basementless home in the crawl space 4, thus avoiding the necessity for an expensive basement construction which many contractors refuse to build and many home purchasers do not want. In some instances the crawl space may be nearly adequate for the heat or cold storage apparatus. If the crawl space is inadequate, a depression in the storage space area may be scooped out and the earth taken from the depression may be banked around the foundation walls 45 as at 46 to help divert rainwater from the foundation walls. Part of the earth may be banked around the storage bin walls as at 47. However, sand or other granular insulating material is deemed to be a preferable material for this embankment. Due to the low cost, and inasmuch as dry sand is a fair insulator, and inasmuch as dampness tends to dissipate more readily from sand following a dampening thereof, sand is good for the embankment 47. Windows or ventilators may be provided at 48.

The storage bin compartment 44 is preferably formed in the crawl space by walls 50. These walls may support the floor joists to thus save on construction costs for typical steel I beams. These walls may extend beyond the storage bin walls at 51 if desired (see FIG. 2) so as to support the floor joists beyond the storage bin walls. The storage bin is preferably insulated at the top between the floor joists and on the side walls of the storage bin. If desired the insulation may be placed around the outside of the walls as at 52 so that the wall material itself, which may be bricks, blocks or other, will serve to increase heat or cold storage capacity of the bin. Further, when the insulation is placed outside, there is no crushing thereof by the stone or other heat storage apparatus.

The storage bin preferably has a vapor barrier 55 in the bottom thereof and a granular semi-insulating material 56 such as dry sand, thereabove. If desired a second vapor barrier may be provided above the sand. Also, a vapor barrier is preferably provided around bin walls 50 exteriorly of insulation 52. An air distributor system 58 may be used to distribute air to the area beneath the drum 42 and beneath the stone or other heat storage material 59. A water cooling element such as a refrigeration evaporator may be inserted in drum 42 as illustrated at 43. This element cools the drum of water, and stone around the drum, for air conditioning the building during hot weather. Auxiliary heat, for use during long cloudy spells of the winter when solar heat input is insufficient, may be provided by reversing the heat pump operation so as to get auxiliary heat from coils 43. Or, electric heating element 60, or a gas or oil burning unit, or a combination of such units, may be used for auxiliary heat. A blower is provided at 61 to circulate air thru the storage apparatus and the building to be heated or cooled.

In the present description main emphasis is on collection by circulating a liquid through the collector and storing hot water in the storage bin 44. However, it is anticipated that a gas such as air may be circulated through the collector and through the storage bin by a blower whereby to heat the stonelike material 59, either with or without the drum of water, for storage of the heat. Cooling coils 43 may be used to chill the water in drum 42, or may be embedded in stone 59 to chill the stone directly for summertime air-conditioning if no water drum is provided.

If desired a drain pipe may be connected in the bottom of the sand space as at 62 so that water could be drained or pumped from the sand in an emergency such as where a local flood, or leaking of drum 42 or of a water line or such would flood the heat bin.

The blower 61 is used to withdraw cold air from the home and introduce in into the heat storage bin through the air distributor system 58. A very simple, inexpensive air distributor system may be made of building blocks, with holes therein, laid on edge so that the holes align to form air ducts or passages. The blocks are spaced apart slightly to allow air to pass out therefrom at spaced points. The air then spirals back and forth up through the stones and around the drum. Of course bricks or other materials could be used to form perforated ducts to introduce air into the bottom of the bin.

The domestic water preheater assembly 40 has an outer tank 65, insulated to prevent heat loss, and in inner tank 66 for fresh water under pressure. The fresh water tank is bathed in hot solar-heated water from the solar heat collector and the outer tank need not be under pressure. Normal water level 67 is attained automatically each time it rains, the rainwater falling on the heat collector 1 flowing into collector manifold 8 and down into the automatic rainwater makeup device and sediment trap 38. When the water has reached the proper level 67, excess water overflows via 39. Sediment settles out at 68 to keep the water in the system clean. Thus, the automatic water makeup system requires no expensive valve to possibly fail and cause trouble. If desired, a float-controlled valve can be used to admit makeup water from a public water supply. However, the apparatus herein described makes such arrangement unnecessary for most installations.

For wintertime solar heating, water is withdrawn from the bottom of large drum 42 via outlet 70 and is circulated to distributor manifold 6 at the top of collector 1. As the water descends it is heated and is collected in collector manifold 8 as hot water. From manifold 8 it flows to sediment trap 38 and via pipe 71 into the outer tank 65 of domestic water preheater 40. The hot water thus bathes the fresh water tank 66 to heat the water therein and passes on out from outer tank 65 via 72, 73 into large drum 42 to heat the water in the large drum. The drum of hot water yields up part of its heat load to the surrounding stone or other heat storage material 59 while the water cools back down ready to take on another "load of heat" on its next pass through the heat collector 1. Air from the home is circulated around the drum of heated water and through the heated stone to warm the air and the home as needed.

For summertime use, water is not drawn out from large drum 42 via outlet 70 but is drawn directly from tank 65 via 72 and 74 and is then recirculated to the heat collector 1 until the domestice water is sufficiently heated. Domestic water heater assembly 40 is insulated from storage bin 44. During the hot weather the water in large drum 42 may be chilled, preferably at night, by flowing the water over the heat collector via distributor manifold 7, or by flowing it over the north-sloping roof of the building, or by refrigeration cooling coils 43, or by a combination of these features. If the water is chilled by flowing it over the north sloping roof, or over the heat collector, it is returned directly to drum 42 by appropriate connections, thus leaving hot water in heater 40 while chilling water in drum 42. If any water is lost from the heat collector system it is automatically replenished by rainwater. However, if a drought condition occurs, the relatively small reserve of water in the top of the tank 65 may be lost. With the apparatus herein described if the water level in tank 65 drops to a level below the top of large drum 42, then makeup water from drum 42 will flow automatically into tank 65, or to outlet 74 while water is being drawn from 74 for circulation to the collector. Thus, a relatively large amount of water is available from drum 42 to automatically replenish water in the domestice water heating system 40 in the event of emergency drought conditions or excessive loss of water from the solar water heating system.

Distributor manifold 7 may be used for many purposes. Water may be circulated to manifold 7 at night to flow down over the outside of the heat collector transparency and to thus cool the water. The water may be collected in trough 8 of the heat collector and passed directly to drum 42 by simple means well-known to an engineer. Or the water may be chilled by circulating it over the north-sloping roof at night. In some climates this method of heat dissipation is adequate for air-conditioning the home. If ice and snow should accumulate on the collector it can be dislodged by flowing water onto the collector transparency by way of distributor 7. If dust collects excessively and the collector transparency is not washed clean by rainwater, water may be brought onto the collector through distributor manifold 7 to wash the collector.

What I claim is:

1. In a solar building, a solar heat collector to heat a liquid circulating therethrough, means to introduce a fluid on top of the collector to be cooled, means to introduce a fluid into the collector to be heated, collector means to collect said fluids from said collector, said collector comprising a corrugated heat collecting sheet with insulation therebeneath and a transparency thereabove, an automatic sediment trap and excess liquid overflow device, a domestic water heater, a large liquid storage drum with apparatus to chill or heat the liquid therein, heat storage material around the large drum, means for conducting the heated, or the cooled, or rain liquid which may fall on top of the collector from the collector means to the automatic sediment trap and excess liquid overflow device, means for conducting the liquid from the sediment trap and overflow device serially to the domestic water heater and in turn to the storage drum, means for conducting the liquid from said drum for recirculation to said heat collector during cold weather, means for bypassing said large liquid storage drum during hot weather, the liquid entering said large drum at a point spaced below the top thereof to permit backflow of liquid from the large drum if the liquid level of the water in the water heater is lowered below the top of the large drum, said heat storage material and large drum being located beneath the building, a heat (or cold) storage bin surrounding said storage material, and means to circulate air from the building through the storage bin to heat the building during cold weather or to cool the building during hot weather.

2. In a solar building, a solar heat collector to heat a liquid circulating therethrough, means to introduce a fluid on top of the collector to be cooled, means to introduce a fluid into the collector to be heated, collector means to collect said fluids from said collector, an automatic sediment trap and excess liquid overflow device, a domestic water heater, a large liquid storage drum with apparatus to chill or heat the liquid therein, heat storage material around the large drum, means for conducting the heated, or the cooled, or rain liquid which may fall on top of the collector from the collector means to the automatic sediment trap and excess liquid overflow device, means for conducting the liquid from the sediment trap and overflow device serially to the domestic water heater and in turn to the storage drum, means for conducting the liquid from said drum for recirculation to said heat collector during cold weather, means for bypassing said large liquid storage drum during hot weather, the liquid entering said large drum at a point spaced below the top thereof to permit backflow of liquid from the large drum if the liquid level of the water in the water heater is lowered below the top of the large drum, said heat storage material and large drum being located beneath the building, a heat (or cold) storage bin surrounding said storage material, exterior insulation and vapor resistant means for said bin, and means to circulate air from the building through the storage bin to heat the building during cold weather or to cool the building during hot weather.

3. In a solar building, a solar heat collector to heat a liquid circulating therethrough, means to introduce a fluid on top of the collector to be cooled, means to introduce a fluid into the collector to be heated, collector means to collect said fluids from said collector, an automatic sediment trap and excess liquid overflow device, a domestic water heater, a large liquid storage drum with apparatus to chill or heat the liquid therein, heat storage material around the large drum, means for conducting the heated, or the cooled, or rain liquid which may fall on top of the collector from the collector means to the automatic sediment trap and excess liquid overflow device, means for conducting the liquid from the sediment trap and overflow device serially to the domestic water heater and in turn to the storage drum, means for conducting the liquid from said drum for recirculation to said heat collector during cold weather, means for bypassing said large liquid storage drum during hot weather, the liquid entering said large drum at a point spaced below the top thereof to permit backflow of liquid from the large drum if the liquid level of the water in the water heater is lowered below the top of the large drum, said heat storage material and large drum being located beneath the building, a heat (or cold) storage bin surrounding said storage material, and means to circulate air from the building through the storage bin to heat the building during cold weather or to cool the building during hot weather.

4. In a solar building, a solar heat collector to heat a liquid circulating therethrough, means to introduce a fluid on top of the collector to be cooled, means to introduce a fluid into the collector to be heated, collector means to collect said fluids from said collector, an automatic sediment trap and excess liquid overflow device, a domestic water heater, a large liquid storage drum with apparatus to chill or heat the liquid therein, heat storage material around the large drum, means for conducting, the heated, or the cooled, or rain liquid which may fall on top of the collector from the collector means to the automatic sediment trap and excess liquid overflow device, means for conducting the liquid from the sediment trap and overflow device serially to the domestic water heater and in turn to the storage drum, means for conducting the liquid from said drum for recirculation to said heat collector during cold weather, means for bypassing said large liquid storage drum during hot weather, the liquid entering said large drum at a point spaced below the top thereof to permit backflow of liquid from the large drum if the liquid level of the water in the water heater is lowered below the top of the large drum, said heat storage material and large drum being located beneath the building, and a heat (or cold) storage bin surrounding said storage material.

5. In a solar building, a solar heat collector, means for introducing a liquid to and retrieving liquid from said collector, said collector comprising a corrugated heat collecting sheet with insulation therebeneath and a transparent covering thereabove, frame means around said heat collector, said corrugated sheet comprising a single sheet folded near its centerline to provide a top sheet and a bottom sheet for fluid flow therebetween and a sealed edge along an edge of the heat collector, a heat or cold storage bin, means to conduct liquid from said collector to said bin, said bin containing means to store said liquid, and an air distributor system to withdraw air from said building and distribute the air substantially uniformly to various points of said bin, said bin containing a heat or cold storage material around said means to store said liquid through which said air is circulated, means in said bin to provide auxiliary heat when desired or to provide coolness when desired, and means to insulate said storage bin to minimize transfer of heat into or out from said storage bin.

6. In a solar building, a solar heat collector, means for introducing liquid to and retrieving liquid from said collector, said collector comprising a heat collecting sheet with insulation therebeneath and a transparent covering thereabove, a heat or cold storage bin, means to conduct liquid from said collector to said bin, said heat or cold storage bin comprising means to store said liquid, and an air distributor system to withdraw air from said building and distribute the air substantially uniformly to various points of said bin, said bin containing a heat or cold storage material around said means to store said liquid through which said air is circulated, means in said bin to provide auxiliary heat when desired or to provide coolness when desired, and means to insulate said storage bin to minimize transfer of heat into or out from said storage bin.

7. In a solar building heat or cold storage apparatus comprising; a sediment trap, a domestic water heater, and a water storage drum, fluid flow passages connecting said trap, heater and drum in series relationship, an excess liquid overflow device connected at a point in one of said passages to determine the maximum height to which liquid may rise in the apparatus, an outlet means in the passage between said domestic water heater and said water storage drum from which water may be drawn, the passage between the domestic water heater and said water storage drum including a connection to the water storage drum at a point below the top thereof, said water storage drum being located in an insulated storage bin containing heat or cold storage material in addition to said water storage drum, apparatus for chilling said water storage drum to chill said storage apparatus for cold storage or to provide auxiliary heat when solar heating input is inadequate, said storage bin being located beneath a building and insulated around the exterior thereof, and vapor resistant means around portions of said storage apparatus.

8. In a solar building heat or cold storage apparatus comprising; a sediment trap, a domestic water heater, and a water storage drum, fluid flow passages connecting said trap, heater and drum in series relationship, an excess liquid overflow device connected at a point in one of said passages to determine the maximum height to which liquid may rise in the apparatus, an outlet means in the passage between said domestic water heater and said water storage drum from which water may be drawn, the passage between the domestic water heater and said water storage drum including a connection to the water storage drum at a point below the top thereof, said water storage drum being located in an insulated storage bin containing heat or cold storage material in addition to said water storage drum.

References Cited by the Examiner

UNITED STATES PATENTS

| | | | |
|---|---|---|---|
| 201,439 | 3/1878 | Moreau | 126—270 |
| 965,391 | 7/1910 | Little | 237—1 |
| 995,219 | 6/1911 | Bradley. | |
| 1,696,003 | 12/1928 | Harvey | 126—271 |
| 1,889,238 | 11/1932 | Clark | 126—271 |
| 2,342,211 | 2/1944 | Newton | 165—18 |
| 2,396,338 | 3/1946 | Newton | 165—18 |
| 2,469,496 | 5/1949 | Christenson | 126—271 X |
| 2,484,127 | 10/1949 | Stelzer | 165—18 |
| 2,544,474 | 3/1951 | Swanton | 126—271 X |
| 2,553,302 | 5/1951 | Cornwall | 237—1 |
| 2,660,863 | 12/1953 | Gerhart | 126—271 X |
| 2,677,243 | 5/1954 | Telkes | 126—270 X |
| 2,680,565 | 6/1954 | Lof | 237—1 |
| 2,693,939 | 11/1954 | Marchant et al. | 165—45 X |
| 2,705,948 | 4/1955 | Rostock | 126—171 |
| 2,891,774 | 6/1959 | Theoclitus | 165—4 |
| 3,076,450 | 2/1963 | Gough et al. | 126—271 |

FREDERICK L. MATTESON, JR., *Primary Examiner.*

CHARLES SUKALO, *Examiner.*